(12) United States Patent
Froese et al.

(10) Patent No.: US 8,814,265 B2
(45) Date of Patent: Aug. 26, 2014

(54) HEAD REST FOR A VEHICLE (75) Inventors: Ernst-Otto Froese, Solingen (DE); Thomas Dillinger, Ratingen (DE); Alexander Hasler, Duesseldorf (DE)

(73) Assignee: Johnson Controls Technology Company, Holland, MI (US)

( * ) Notice: Subject to any disclaimer, the term of this patent is extended or adjusted under 35 U.S.C. 154(b) by 1213 days.

(21) Appl. No.: 12/674,140

(22) PCT Filed: Aug. 27, 2008

(86) PCT No.: PCT/EP2008/007027
§ 371 (c)(1),
(2), (4) Date: Jul. 25, 2011

(87) PCT Pub. No.: WO2009/030415
PCT Pub. Date: Mar. 12, 2009

(65) Prior Publication Data
US 2011/0272977 A1 Nov. 10, 2011

(30) Foreign Application Priority Data
Aug. 31, 2007 (DE) .......................... 10 2007 041 498

(51) Int. Cl.
*B60N 2/427* (2006.01)
*B60N 2/48* (2006.01)

(52) U.S. Cl.
USPC ..................................... 297/216.12; 297/391

(58) Field of Classification Search
USPC ........................................... 297/216.12, 391
See application file for complete search history.

(56) References Cited

U.S. PATENT DOCUMENTS

| | | | |
|---|---|---|---|
| 2,973,029 A | 2/1961 | Schlosstein | |
| 4,944,554 A * | 7/1990 | Gross et al. | 297/284.3 |
| 6,767,064 B2 * | 7/2004 | Veine et al. | 297/391 |
| 6,805,411 B2 * | 10/2004 | Gramss et al. | 297/408 |
| 8,029,055 B2 * | 10/2011 | Hartlaub | 297/216.12 |
| 2005/0077762 A1 | 4/2005 | Kraemer et al. | |
| 2008/0272631 A1 | 11/2008 | Hartlaub | |

FOREIGN PATENT DOCUMENTS

| | | |
|---|---|---|
| DE | 39 00 495 A1 | 7/1990 |
| DE | 19923909 A1 | 1/2000 |
| DE | 199 41 712 C1 | 10/2000 |
| DE | 10348939 B3 | 1/2005 |
| DE | 102004016474 B3 | 8/2005 |
| DE | 102005052766 B3 | 3/2007 |
| DE | 10 2006 001 143 B3 | 4/2007 |

(Continued)

OTHER PUBLICATIONS

Japanese Office Action dated Jan. 22, 2013.

(Continued)

*Primary Examiner* — Peter Brown
(74) *Attorney, Agent, or Firm* — Fletcher Yoder, P.C.

(57) ABSTRACT

A headrest for a vehicle seat has a first section that is oriented towards the head of a seat occupant, a second section, and a third section. The second section is arranged between the first and third sections. In the event of an accident, the first section may be displaced, due to the relative displacement of the second section, from a working position into a safety position and a comfort position in the direction of the head of the occupant. The relative movement of the sections is a rotation about a rotational axis substantially parallel to the direction of displacement.

8 Claims, 7 Drawing Sheets

(56) References Cited

FOREIGN PATENT DOCUMENTS

| | | |
|---|---|---|
| EP | 0 974 484 A2 | 1/2000 |
| JP | 2007530357 | 11/2007 |
| WO | 2005097545 | 10/2005 |
| WO | 2007076948 | 7/2007 |

OTHER PUBLICATIONS

International Search Report for application No. PCT/EP2008/007027 mailed Mar. 5, 2009.

* cited by examiner

HEAD REST FOR A VEHICLE

CROSS REFERENCE TO RELATED APPLICATIONS

This application claims priority from and the benefit of PCT Application No. PCT/EP2008/007027, filed on Aug. 27, 2008 and German Patent No. DE 10 2007 041 498.8, filed on Aug. 31, 2007; all entitled "Headrest for a Vehicle", which are herein incorporated by reference.

BACKGROUND

The invention relates to a headrest for a vehicle seat in which, in the event of an accident, at least one section of the headrest that is oriented towards the head of the seat occupant may be displaced, due to the action of a drive device, from a working position into a safety position in the direction of the head of the seat occupant.

A headrest is disclosed in the publication DE 199 23 909 A1, which consists of a base body rigidly connected to the backrest of the vehicle seat via retaining bars and optionally also in a height-adjustable manner, and which is arranged in a padded segment formed in a trough-like manner. In the event of an accident, the padded segment is moved in a translatory manner toward the head of the seat occupant in order to prevent whiplash. The force required therefor is produced by a spring pretensioned in the direction of displacement within a telescopic guide device. In the published patent specification DE 39 00 495 A1 a further headrest is disclosed in which, as a result of an accident, a padded segment may be pivoted forward relative to the base body about a fixed rotational axis. A spring-loaded piston/cylinder arrangement in conjunction with a supporting lever serves as a drive device in which the piston rod is articulated in the region of the rotational axis on the base body and the cylinder on the padded segment. Moreover, a headrest is further disclosed in the publication DE 199 41 712 C1, in which a displaceable padded element is connected to the base body via a scissors mechanism, by means of which the padded element may be moved forward from a resting position into a working position. A headrest is, moreover, also disclosed in the publication DE 10 2004 016 474 B3. In this case, sections of the headrest are moved apart in a telescopic manner, in order to adopt a safety position of the headrest. Moreover, a headrest for a vehicle seat is disclosed in the publication DE 103 48 939 B3 in which, for reasons of comfort, the headrest is adjusted according to a movement sequence, and a further movement sequence being performed when, in the event of an accident, the headrest is transferred from its normal position into a protective position. Finally, an active headrest which is adjustable in a linear manner is disclosed in the publication DE 10 2005 052 766 B3.

SUMMARY

The object of the invention is to provide a headrest with a drive device which is effective and of simple and compact design, which in a normal situation of use ensures optimal operability and in the event of an accident ensures optimal safety for a seat occupant.

The object is achieved by a headrest for a vehicle seat in which, in the event of an accident, at least one first section of the headrest that is oriented towards the head of the seat occupant may be displaced, due to the effect of a relative displacement of a second section of the headrest that is arranged substantially between the first section and a third section, from a working position into a safety position and a comfort position in the direction of the head of the seat occupant, in a direction of displacement, characterized in that the relative movement of the sections is a rotation about a rotational axis substantially parallel to the direction of displacement. As a result, in a simple manner a robust and reliable mechanism is provided both for the comfort adjustment and for the safety adjustment of the headrest and/or of the first section of the headrest. It may be provided according to the invention, in particular, that the region between the working position and the safety position is greater than the region between the working position and the maximum adjustable comfort position. Moreover, it may be provided alternatively according to the invention that the region between the working position and the safety position corresponds to the region between the working position and the maximum adjustable comfort position, and that the safety position corresponds, therefore, to the maximum adjustable comfort position.

It is particularly preferred if the second section has a comfort section and a safety section, the comfort section being able to be moved away from the position of the safety section, for adjusting the comfort, starting from a position corresponding to the working position of the first section. As a result, it is possible in a simple manner, substantially based on the same mechanisms and/or based on the same parts of the headrest to implement both a comfort adjustment and a safety adjustment.

Moreover, it is preferred according to the invention that, for adjusting the comfort, the comfort section may be adjusted into a position corresponding to the safety position of the first section, irrespective of the position of the safety section. As a result, for the adjusting range which is available for adjusting the comfort, the maximum adjusting range is advantageously selected so that such a headrest is able to satisfy particularly high comfort requirements.

Furthermore, according to the invention it is also preferred that, when activated, the movement of the safety section is provided to be substantially load-free as far as the position of the comfort section. As a result, for the movement of the adjustment of the safety position it may be advantageously achieved that substantially no amount of energy or only a relatively small amount of energy, of the energy stored in an actuator, is used for moving the safety section as far as the position of the comfort section.

Furthermore, according to the invention it is preferred that the first section has at least one first oblique surface and the second section has at least one second oblique surface and/or that the third section has at least one third oblique surface and the second section has at least one fourth oblique surface, at least a portion of the oblique surfaces extending substantially helically about the rotational axis and, with a relative movement of the second section about the rotational axis, effect a movement of the first and/or second section in the direction of displacement. As a result, firstly a particularly effective transfer of the rotational movement of the second section into a translatory movement of the first section may be effected and, secondly, by the provision of two pairs of oblique surfaces (namely between the first section and the second section, on the one hand, and between the second section and the third section, on the other hand) with the same rotational angle of the rotational movement of the second section an increase in the translatory movement of the first section in the direction of displacement may be effected by an opposing arrangement of the pairs of oblique surfaces.

According to the present invention, it is further preferred that the first and second oblique surfaces act on both sides and/or the third and fourth oblique surfaces act on both sides. As a result, it is possible that a relatively well-defined rotational and/or rotational and translational adjustment of the second section of the headrest corresponds substantially to each translational adjustment of the first section of the headrest. In particular, as a result, it is possible according to the invention that the headrest may be returned again in a simple manner after activation (i.e. after the adjustment of the safety position).

Furthermore, according to the invention it is preferred that the fourth oblique surface is provided on the comfort section. This has the advantage that a particularly stable force transmission may be implemented between the first section and the third section—namely exclusively via the comfort section of the second section.

According to the invention, it is further preferred if a blocking device is provided for blocking or reducing a movement of the first section of the headrest counter to the direction of displacement, the blocking device comprising teeth in the region of the third oblique surface and the fourth oblique surface. As a result, a possibility for blocking is provided in a simple yet reliable manner such that, after activating the safety mechanism of the headrest, the first section is no longer displaced or at least no longer displaced substantially back in the direction of the working position.

According to the invention, it is further preferred that the blocking device has at least one blocking pin, in particular in the normal case the blocking pin being provided pretensioned by a spring, for the purpose of an engagement of the teeth, teeth being provided in particular such that a movement counter to the direction of displacement of the headrest and/or of the first section of the headrest is prevented and quite particularly preferably the teeth being provided such that a movement is permitted in the direction of displacement of the headrest and/or of the first section of the headrest. As a result, according to the invention it is firstly possible that, notwithstanding the possibility of adjusting the comfort, a reliable blocking of the headrest is possible in the safety position. Secondly, it is possible that adjusting the comfort of the headrest in the horizontal direction—i.e. a displacement of the first section in the direction of displacement or in the opposite direction for the purposes of comfort—is possible in a simple manner by an actuating element being pressed for moving the headrest and/or the first section of the headrest counter to the direction of displacement, and that a desired displacement of the headrest and/or of the first section of the headrest toward the direction of displacement is possible without an actuation of an actuating element and a displacement is possible in spite of the engagement of the teeth.

It is also preferred according to the invention that between the second and third section and/or between the first and second section a leg spring is provided, pretensioned in the non-activated state. As a result, the adjustment of the safety position may be effected in a simple and effective manner.

Furthermore it is also preferred according to the invention that, after activation, the safety section or the comfort section and the safety section may be moved, due to a displacement of the first section, counter to the direction of displacement into the position corresponding to the working position. As a result, a headrest once activated and/or a headrest with a safety mechanism activated as a result of an accident may be moved again in a simple manner into the working position without, for example, having to carry out an opening of the headrest, which markedly reduces the maintenance costs and/or the repair costs—in particular in the event of an unjustified activation of the adjustment of the safety position.

DRAWINGS

The figures represent by way of example and schematically various embodiments of the invention, in which.

DETAILED DESCRIPTION

Figure 1:
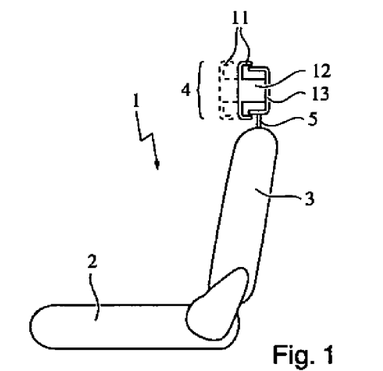
FIG. 1 shows a vehicle seat comprising a headrest.

According to FIG. 1 a vehicle seat 1 according to the invention and/or a vehicle seat 1 provided with a headrest 4 according to the invention comprises a seat part 2 and a backrest 3 connected thereto, in particular in a manner in which the inclination may be adjusted, and which is provided with the headrest 4. Pairs of retaining bars 5 may be provided for fastening the headrest to the backrest 3. However, alternatively other fastening options (not shown) may also be provided between the backrest 3 and the headrest 4. The pairs of retaining bars 5 of the headrest 4 may be connected pivotably in the upper region of the backrest 3 or in the region of the headrest 4 via an articulation (not shown) to the backrest 3 and/or to the headrest 4. According to the invention, the headrest 4 comprises at least one first section 11 of the headrest 4 facing the head of the seat occupant, which as a result of an accident may be displaced under the action of a relative movement of a second section 12 of the headrest 4 arranged substantially between the first section 11 and a third section 13, from a working position (illustrated by solid lines in FIG. 1) toward the head of the seat occupant in a direction of displacement into a safety position (illustrated by dotted lines in FIG. 1). The first section 11 is, in particular, a padded element on which the head of the seat occupant may be rested and/or supported. The third section 13 of the headrest 4 is, in particular, a base body of the headrest 4, which is rigidly connected to the backrest 3 via the retaining bars 5 or also in a manner in which the height and/or inclination may be adjusted. A drive device, disclosed hereinafter in detail and comprising the second section 12, is arranged inside the headrest 4 between the first section 11 and the third section 13, which effects the displacement of the first section 11 in a direction of movement C toward the head of the seat occupant.

Figure 2A:
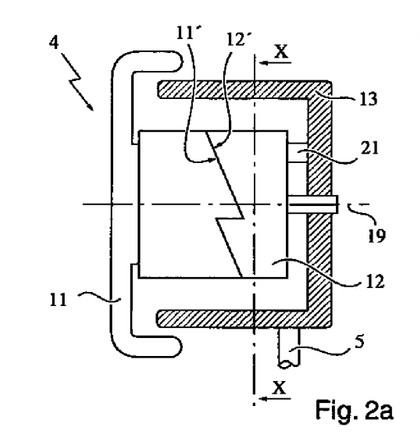
FIGS. 2A-2D show sections through a drive device which may be inserted into the headrest in various operating positions.
Figure 2B:
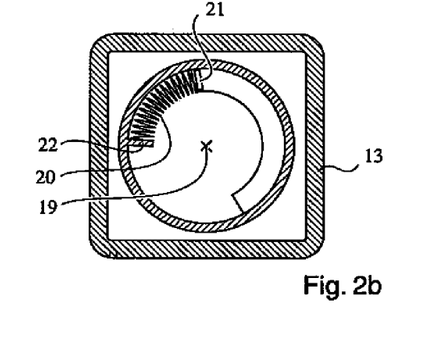
Figure 2C:
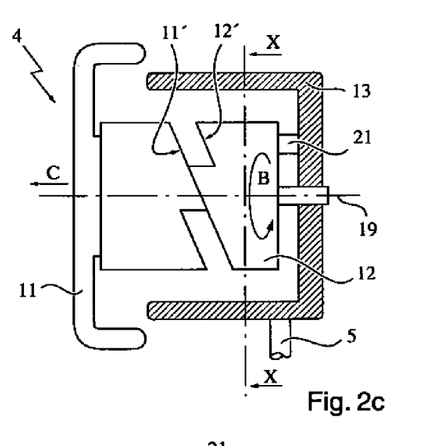
Figure 2D:
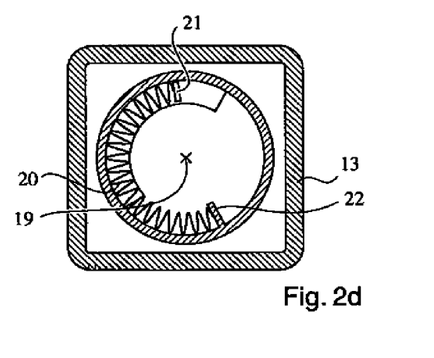

According to FIGS. 2a to 2d, the relative movement of the sections 11, 12, 13 of the headrest 4 according to the invention is schematically shown in more detail. In this connection, FIGS. 2a and 2b show the state of the headrest in the working position and FIGS. 2c and 2d show the state of the headrest in the safety position (displacement of the first section 11 in the direction of the seat occupant, direction of movement C), FIG. 2b representing a front sectional view of the headrest 4 illustrated in FIG. 2a in a lateral sectional view along the cutting line X-X of FIG. 2a, and FIG. 2d representing a front sectional view of the headrest 4 illustrated in FIG. 2c in a lateral sectional view along the cutting line X-X of FIG. 2c. The drive device comprises the second section 12 of the headrest 4, which is connected to the third section 13 and/or base body of the headrest 4 in a rotatable manner about a rotational axis 19. A pretensioned spring 20, shown merely schematically, in the region between two contact points 21 and 22 is—depending on the pretensioning—either able to effect a movement from the working position into the safety position after releasing a locking device, not shown, or, however, to effect a movement from the safety position into the working position (if the movement from the working position into the safety position is carried out by, for example, a Bowden cable drive—for example associated with the presence of an inertia force produced by the seat occupant, for example on the backrest of the seat). In this case, the locking device may be released, for example, by an electromagnetically actuated retaining device or, however, the locking of the pretensioning of the spring may be released by a pyrotechnic device, namely by forcing off a retaining lug or a retaining pin (not shown). In the event of an accident (FIG. 2c, FIG. 2d) the second section 12 is rotated relative to the third section 13 (arrow B). Oblique surfaces rubbing against one another between the first section 11 and the second section 12 and/or between the second section 12 and the third section 13 produce, therefore, an axial force and a forward displacement of the first section 11 parallel to the direction of the rotational axis 19 in the direction of the arrow C (direction of displacement). The front faces of the first section 11 denoted by 11' and/or 12' and facing one another (subsequently also denoted as first oblique surfaces 11') and/or of the second section 12 (subsequently also denoted as second oblique surfaces 12') are configured according to the invention as oblique surfaces such that the rotational movement of the second section 12 is transferred into a translational movement of the first section 11. According to the invention, a blocking device may be provided at this point (i.e. between the first and second oblique surfaces 11', 12') such that a portion or all of said first and second oblique surfaces 11', 12' are provided with—for example sawtooth-like—teeth, which permit a blocking of the first section 11 in its fully extended or partially extended position according to the direction of movement C, when a force acts on the first section 11 moving back said section into the working position (for example after or during an accident, starting from the head of the vehicle occupant). Third and fourth oblique surfaces (not shown in FIGS. 2a to 2d) may either alternatively or in addition to their arrangement between the first section 11 and the second section 12 also be provided between the second section 12 and the third section 13, and alternatively or in addition to the blocking device in the region of the first and second oblique surfaces 11', 12' may have a blocking device of similar design.

According to the present invention, it is provided that the displacement of the first section 11 in the direction of displacement C is possible not only in an accident situation, but also for the purposes of comfort as desired by a user. Thus, apart from the working position, not only the safety position of the first section 11 is possible but at least one comfort position, preferably however a plurality of comfort positions. In this case, according to the invention it is provided, in particular, that the comfort positions are incremental i.e. the adjustment options are not infinite (in other words an unlimited number of comfort settings) but there is a limited number of, for example, between 5 and 50, preferably for example 20 to 30 adjustable comfort positions. According to the invention, it may be provided in this case that starting from the working position the displacement path in the direction of displacement for the purposes of comfort and the displacement path for adjusting the safety position completely overlap or either the displacement path for the purposes of comfort is greater than it is for safety purposes or, in reverse, the displacement path for the purposes of comfort is shorter than for safety purposes. In the embodiment explained below, the displacement path in the direction of displacement for the purposes of comfort and the displacement path for adjusting the safety position completely overlap. This may be implemented according to the invention, for example, such that the second section 12 has a comfort section 122 and a safety section 123, by means of a rotation of the comfort section 122 about the rotational axis 19 starting from the working position or starting from a comfort position a movement of the first section 11 is provided in the direction of displacement C, and by means of a rotation of the safety section 123 about the rotational axis 19 an at least partially combined movement of the comfort section and a movement of the first section 11 is provided in the direction of displacement C. For the sake of a simpler view, however, in FIGS. 2a to 2d neither the safety section 123 nor the comfort section 122 are shown individually.

Figure 3:
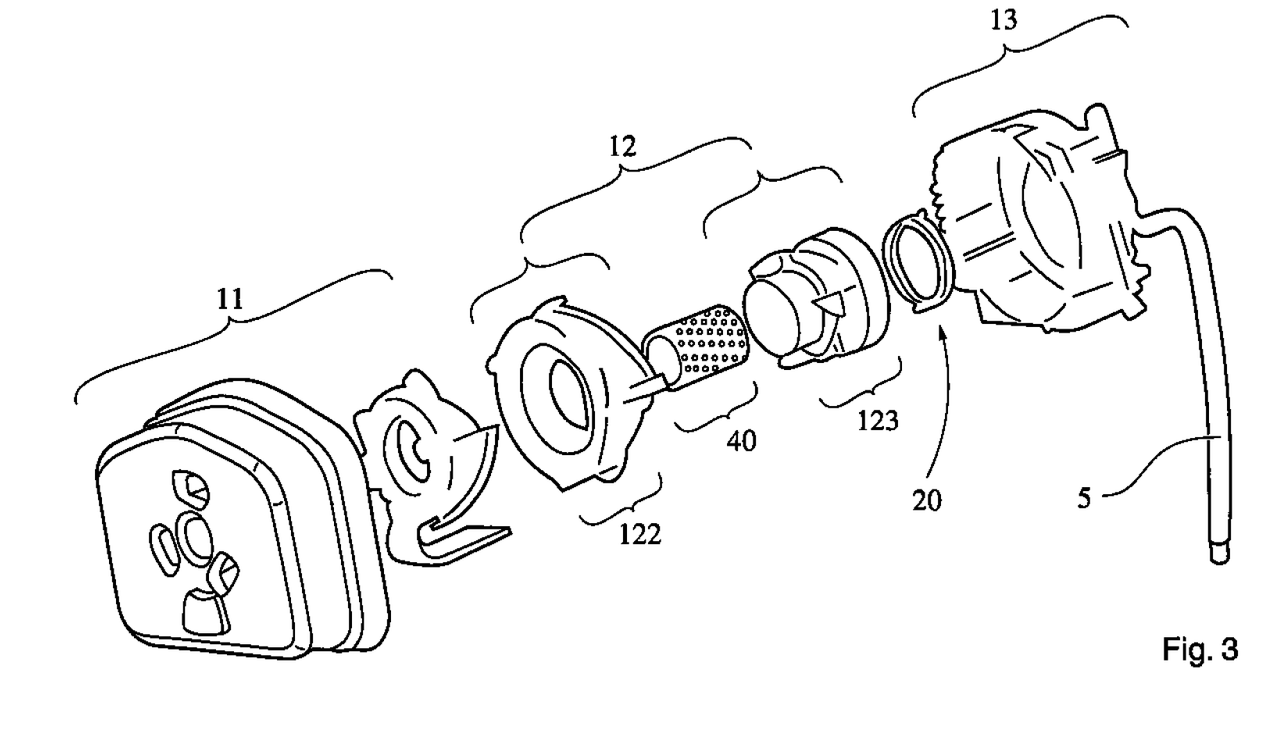
FIGS. 3-8 show various embodiments and/or details of the headrest according to the invention.

In FIGS. 3 to 8 various views of a headrest 4 according to the invention are shown schematically, in FIG. 3 an exploded view and in FIGS. 4 to 8 sectional views of the headrest are respectively shown in various settings and/or positions. The first section 11, the third section 13, the spring 20 configured as a leg spring 20, a bearing cage 40, the retaining bars 5 for the headrest 4 and the second section 12 with the comfort section 122 and the safety section 123 are shown in each case.

Figure 4:
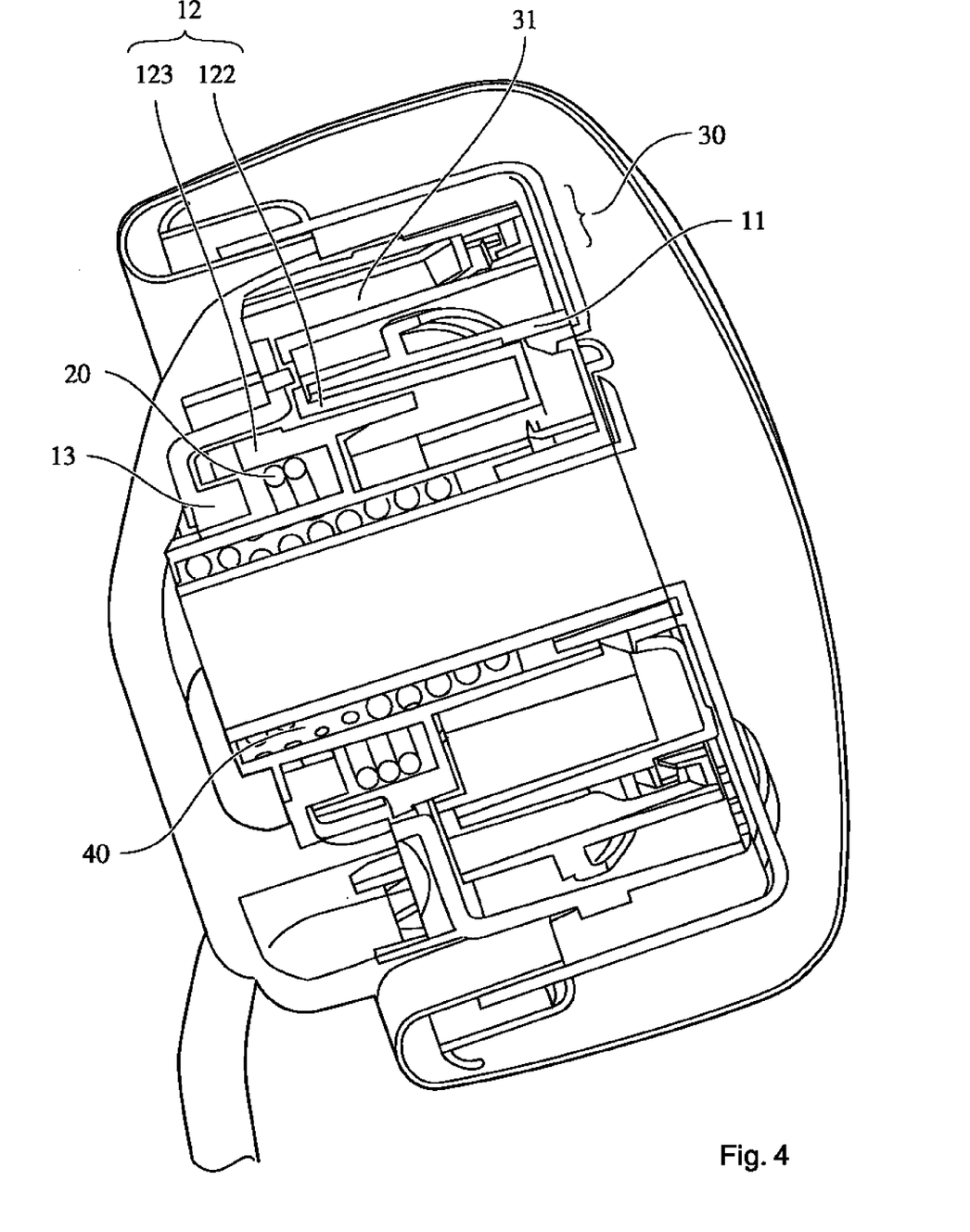

It may be seen from FIGS. 3 and 4 that the bearing cage 40 is arranged between the first section 11 and the second section 12 (and/or between the first section 11 and the comfort section 122 of the first section 12). The bearing cage 40 preferably has, according to the invention, a plurality of rolling bodies 41.

Figure 5:
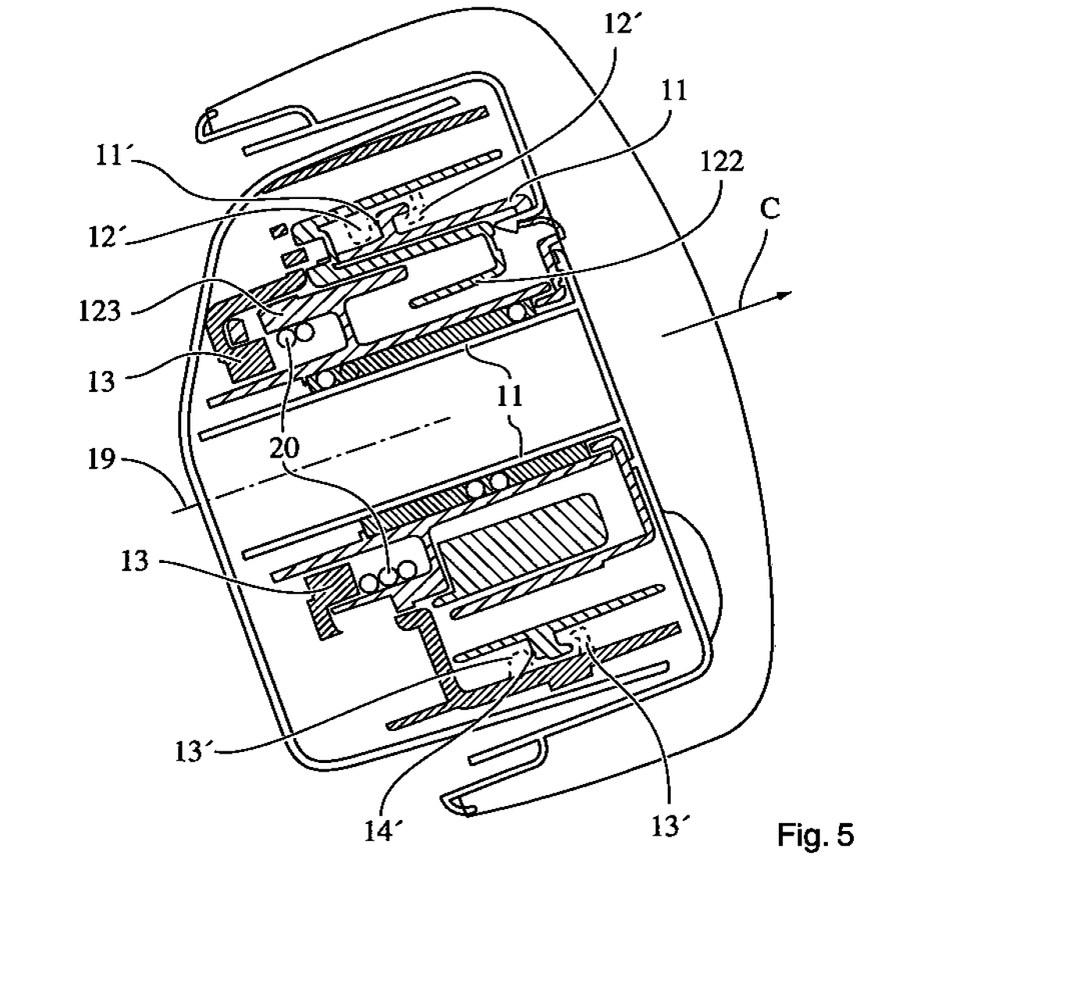
Figure 6:
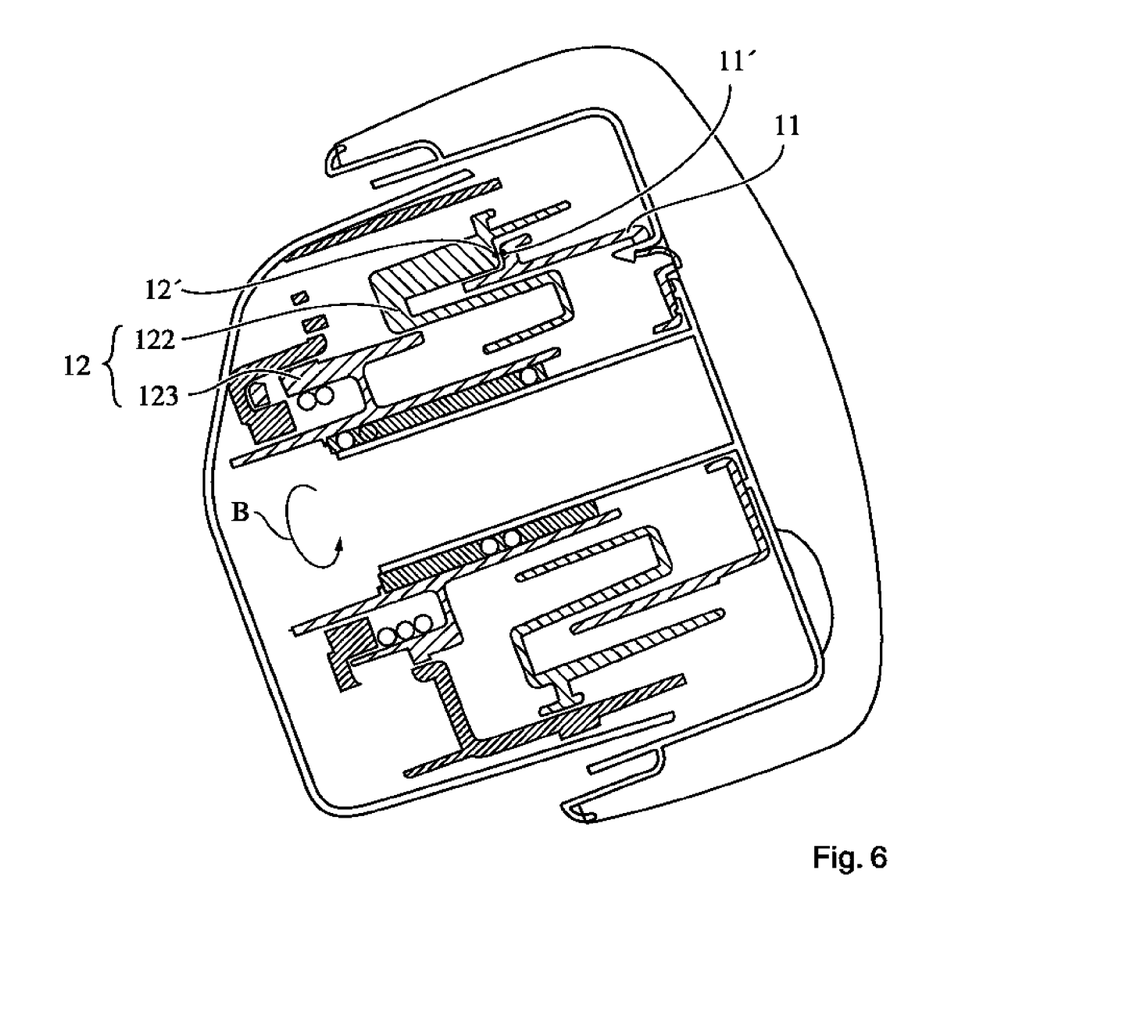
Figure 7:
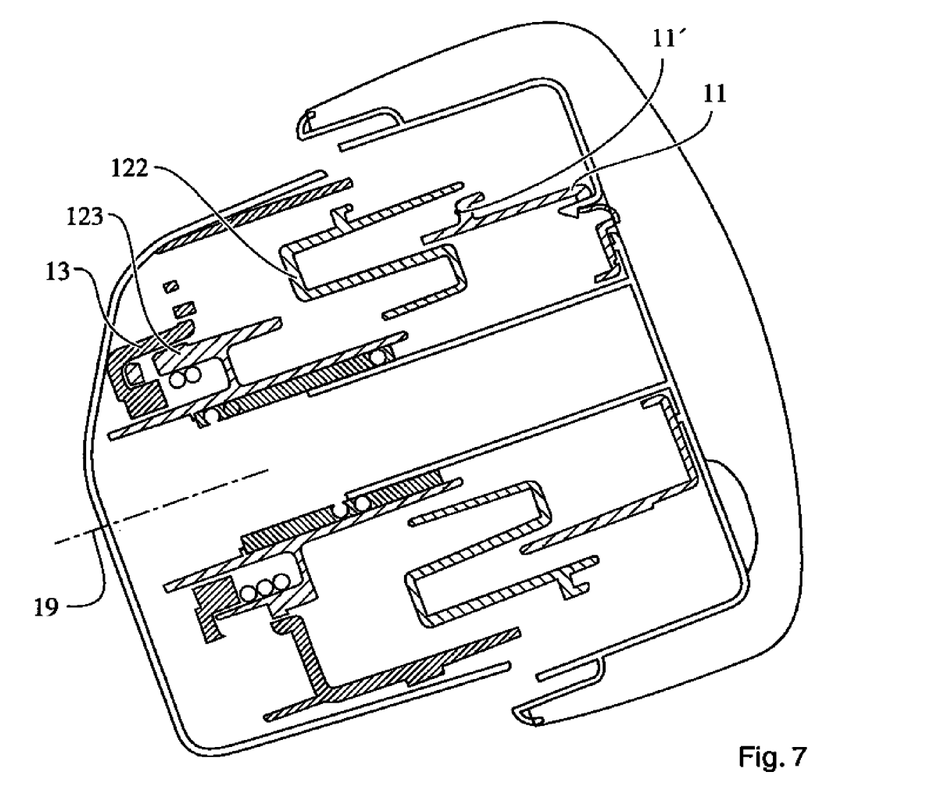
Figure 8:
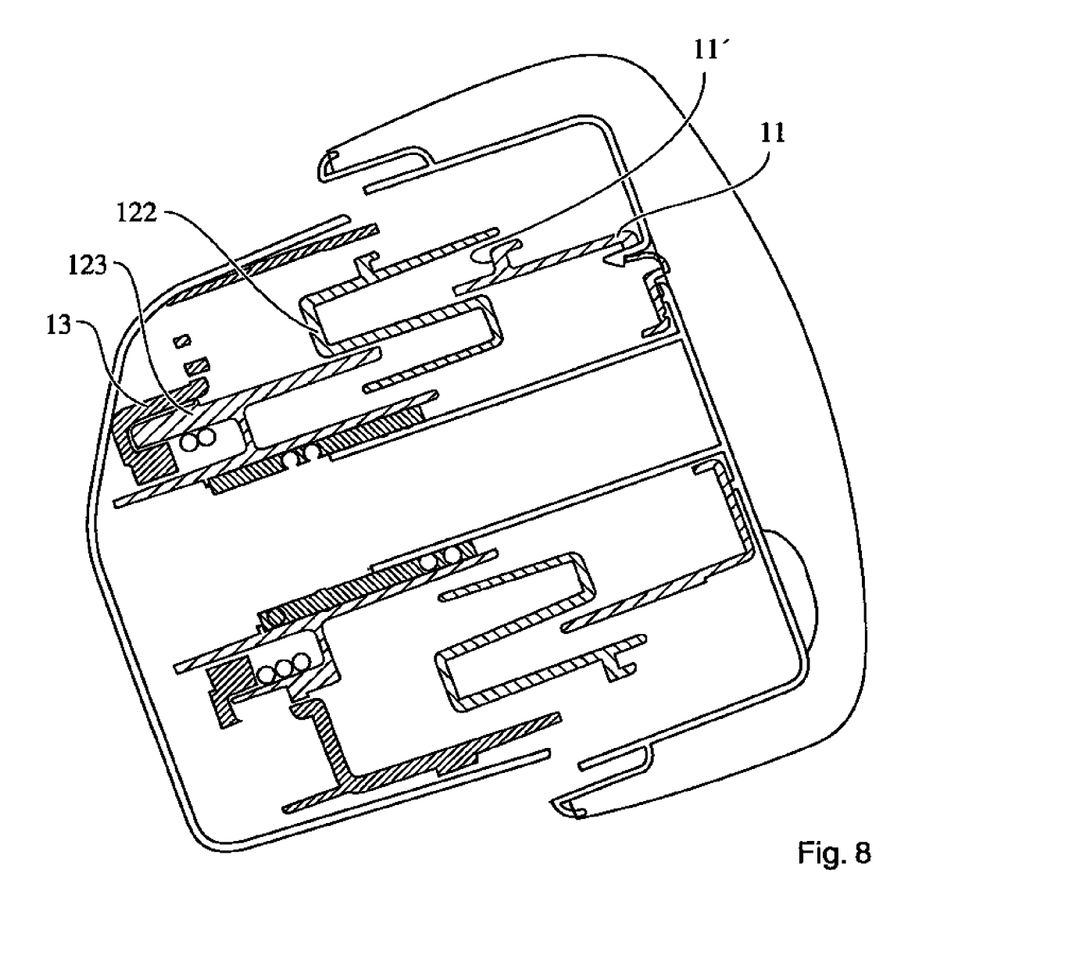

In FIGS. 5, 6, 7 and 8, various settings of the headrest 4 and/or of the first section 11 of the headrest 4 relative to the remaining headrest 4 are shown in sectional view, in FIG. 5 the working position being shown, a partially extended position (namely half) of the first section 11 for the purposes of comfort being shown in FIG. 6, in FIG. 7 a maximum extended position of the first section 11 being shown for the purposes of comfort and in FIG. 8 the safety position being shown.

In this case, in particular from a comparison of the views in FIGS. 5, 6 and 7 it may be seen that, starting from the working position, with a rotational movement (according to the arrow B) of the comfort section 122, a translational displacement (toward the direction of displacement C) is brought about of the comfort section 122 from the safety section 123, on the one hand, as well as a translational displacement (toward the direction of displacement C) of the first section 11 from the comfort section 122, on the other hand (see FIGS. 5 and 6). With a further rotation of the comfort section 122, the translational displacement (toward the direction of displacement C) of the comfort section 122 from the safety section 123 is increased, as well as the translational displacement (toward the direction of displacement C) of the first section 11 from the comfort section 122, on the other hand (see FIGS. 6 and 7). This result is produced by the oblique surfaces 11', 12', 13' and 14'. In this case, a portion of the oblique surfaces—in particular the first oblique surfaces 11' and the fourth oblique surfaces 14'—may be provided as helical oblique surfaces about the substantially cylindrical path (at the respective point) of the first section 11, on the one hand, and of the second section 12 and/or of the comfort section 122, on the other hand, in particular the respective opposing surfaces, i.e. the second oblique surfaces 12' opposing the first oblique surfaces 11' and/or the third oblique surfaces 13' opposing the fourth oblique surfaces 14' being merely designed as abutments and/or stop points, which secure the respective oblique surfaces (i.e. the first oblique surfaces 11' and the fourth oblique surfaces 14') on both sides against moving in the direction of displacement C, but in turn do not have to be of helical configuration. An example thereof is shown schematically in FIG. 5, in which on only one respective side of the rotational axis 19 the second oblique surfaces 12' and the fourth oblique surfaces 14' are shown in dotted lines, arranged both in the direction of displacement C above the first oblique surfaces 11' and/or fourth oblique surfaces 14' and in the direction of displacement C below the first oblique surfaces 11' and/or fourth oblique surfaces 14'. The peripheral extent of the second oblique surfaces 12' and/or the third oblique surfaces 13' about the rotational axis 19 may, in this case, be limited to a range of a few angular degrees up to approximately 10° to 15°, as the helical first and/or fourth oblique surfaces 11', 14' in this embodiment are retained in the direction of displacement C, between the projections forming the second and/or third oblique surfaces 12', 13'. As a result, it is further ensured that a predetermined relative rotational position (in the present case between the first section 11 and the comfort section 122 and/or between the comfort section 122 and the third section 13) is linked with a predetermined relative translational position. Viewed in the direction of displacement C, the oblique surfaces 11', 12', 13', 14', in particular the helical first and fourth oblique surfaces 11', 14' may, for example, be applied three times along a periphery, for example, of the comfort section 122 so that a maximum rotation of the comfort section 122 of a maximum of 120° is produced, generally of approximately 70° up to 110°. Alternatively, the oblique surfaces may, for example, also be applied twice or four times along a periphery, for example of the comfort section 122.

Furthermore, in particular the first oblique surfaces 11' and the fourth oblique surfaces 14' run in opposing directions, so that the maximum travel of the first section 11 in the direction of displacement C, with a relatively compact design of the headrest 4, is maximized as far as possible toward this direction of displacement C.

The difference between the view in FIG. 8 and the view, in particular, in FIG. 7 is substantially that the spring 20, which was pretensioned in the situations shown, for example, in FIGS. 5, 6 and 7, is now released by the release of a locking device, not shown, and between the third section 13, i.e. the base body of the headrest 4, and the safety section 123 has caused a movement (of the first section 11) into the safety position. The movement into the safety position takes place, in the embodiment shown, by the safety section 123 being moved by the released and/or unlocked spring 20 or by another drive mechanism—namely a Bowden cable driven by the seat occupant as a result of inertia forces—rotatably about the rotational axis 19. If the comfort section 122 is not in the rotational position according to FIG. 7 (corresponding to the safety position of the headrest and/or of the first section 11) a stop of the safety section 123 strikes against the comfort section 122 and moves said comfort section rotatably (and/or according to the embodiment rotationally and translationally) into the position corresponding to the safety position, as well as the first section 11 into the safety position. An opposing movement (counter to the direction of displacement C) of the first section 11, moving via dead travel, is prevented due to a blocking device 30, not shown, in the form of teeth in the region of the third and fourth oblique surfaces 13', 14'. To this end, at least one pair consisting of a helical oblique surface and a non-helical oblique surface is provided with teeth, i.e. of, for example, three oblique surfaces distributed over the periphery only one oblique surface is provided with teeth. In the embodiment, it is further provided that the toothed surface, for example of the third oblique surface 13' may be lifted away, for example by means of a blocking pin 31 optionally pretensioned by a spring, from the toothed engagement provided in the normal case with the fourth oblique surface 14 and thus the blocking action of the blocking device 30 may be cancelled. As a result—in particular in the event of adjusting the comfort, i.e. with the locked spring 20—it is possible, by manual actuation of the blocking pin 31 and by pressing onto the first section 11, to achieve an adjustment of the first section 11 counter to the direction of displacement C. Even when the spring 20 is unlocked—after actuation of the blocking pin 31 for the purpose of unlocking—this possible movement may be carried out counter to the direction of displacement C against the action of the force of the spring 20 and it is thus possible, in principle, according to the present invention and after triggering the drive device, to restore the headrest which has been adjusted into the safety position.

The invention claimed is:

1. A headrest for a vehicle seat comprising: a first section that is oriented toward a head of a seat occupant, a second section, and a third section configured to couple to a backrest of the vehicle seat, wherein the second section is arranged substantially between the first section and the third section, the first section is movable relative to the third section in a displacement direction toward the head of the seat occupant;

wherein the second section comprises a comfort section and a safety section positioned proximate to the comfort section, and the comfort section comprises a second engagement surface configured to contact a first engagement surface of the first section, a fourth engagement surface configured to contact a third engagement surface of the third section, or a combination thereof;

wherein the comfort section is configured to rotate in a first rotational direction about a rotational axis substantially parallel to the displacement direction to drive the first section to move in the displacement direction through a comfort range of motion via contact between the first and second engagement surfaces, via contact between the third and fourth engagement surfaces, or a combination thereof, without rotation of the safety section, and the comfort range of motion of the first section extends from a minimum comfort position proximate to the third section to a maximum comfort position remote from the third section; and wherein the safety section comprises a stop configured to engage the comfort section, a drive device is configured to drive the safety section to rotate in the first rotational direction in the event of an accident, rotation of the safety section about the rotational axis in the first rotational direction is configured to drive the comfort section to rotate about the rotational axis in the first rotational direction via contact between the stop and the comfort section to facilitate movement of the first section to a safety position.

2. The headrest as claimed in claim 1, wherein the safety position corresponds to the maximum comfort position.

3. The headrest as claimed in claim 1, wherein the first section comprises the first engagement surface, and the first and/or second engagement surface comprises a respective oblique surface extending substantially helically about the rotational axis.

4. The headrest as claimed in claim 3, wherein the third section comprises the third engagement surface, and the third and/or fourth engagement surface comprises a respective oblique surface extending substantially helically about the rotational axis.

5. The headrest as claimed in claim 4, comprising a blocking device having teeth extending along a first region of the third engagement surface and along a second region of the fourth engagement surface, wherein the teeth of the first region are configured to engage the teeth of the second region to block rotation of the comfort section relative to the third section in a second rotational direction, opposite the first rotational direction.

6. The headrest as claimed in claim 5, wherein the blocking device comprises at least one blocking pin configured to contact the first region or the section region and to drive the first and second regions away from one another via linear movement of the blocking pin in a first translational direction to facilitate rotation of the comfort section relative to the third section in the second rotational direction.

7. The headrest as claimed in claim 6, comprising a biasing device configured to urge the blocking pin in a second translational direction, opposite the first translational direction.

8. The headrest as claimed in claim 1, wherein between the second and third sections and/or between the first and second sections a leg spring is provided, pretensioned in a non-activated state.

* * * * *